US010302151B2

(12) United States Patent
Hor et al.

(10) Patent No.: US 10,302,151 B2
(45) Date of Patent: May 28, 2019

(54) HYDROSTATIC CLUTCH ACTUATOR WITH OVERFLOW

(71) Applicant: Schaeffler Technologies AG & Co. KG, Herzogenaurach (DE)

(72) Inventors: Simon Hor, Buhl (DE); Eduard Muller, Kehl-Auenheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 168 days.

(21) Appl. No.: 15/501,944

(22) PCT Filed: Jul. 24, 2015

(86) PCT No.: PCT/DE2015/200419
§ 371 (c)(1),
(2) Date: Feb. 6, 2017

(87) PCT Pub. No.: WO2016/023550
PCT Pub. Date: Feb. 18, 2016

(65) Prior Publication Data
US 2017/0227069 A1 Aug. 10, 2017

(30) Foreign Application Priority Data

Aug. 12, 2014 (DE) ........................ 10 2014 215 926

(51) Int. Cl.
*F16D 25/08* (2006.01)
*F16D 48/02* (2006.01)
(Continued)

(52) U.S. Cl.
CPC ............. *F16D 25/08* (2013.01); *F16D 28/00* (2013.01); *F16D 48/02* (2013.01); *F16D 25/10* (2013.01);
(Continued)

(58) Field of Classification Search
CPC ......................... F16D 2048/0218; F15B 1/26
See application file for complete search history.

(56) References Cited

U.S. PATENT DOCUMENTS 4,407,125 A * 10/1983 Parsons .................. B60T 11/16
60/584
8,197,012 B2 * 6/2012 L'Aot ..................... B60T 11/26
137/558
(Continued)

FOREIGN PATENT DOCUMENTS

DE 2615986 10/1976
DE 102006053769 6/2007
(Continued)

*Primary Examiner* — Thomas E Lazo
(74) *Attorney, Agent, or Firm* — Volpe and Koenig, P.C.

(57) ABSTRACT

The present invention relates to a hydrostatic clutch actuator for a clutch, in particular a wet clutch, of a motor vehicle, wherein the clutch actuator has a drive unit, a master cylinder-piston-cylinder unit driven thereby, a hydraulic reservoir fluidically connected to the master cylinder-piston-cylinder unit, and a hydraulic system for actuating the clutch, wherein, by use of the master cylinder-piston-cylinder unit, hydraulic medium can be conveyed out of the hydraulic reservoir into the hydraulic system, and the hydraulic system can be pressurized, and the hydraulic reservoir has an overflow, via which hydraulic medium can be discharged from the hydraulic reservoir and the hydraulic system.

6 Claims, 2 Drawing Sheets

(51) Int. Cl.
    *F16D 28/00*    (2006.01)
    *F16D 21/06*    (2006.01)
    *F16D 25/10*    (2006.01)

(52) U.S. Cl.
    CPC ............... *F16D 2021/0653* (2013.01); *F16D 2048/0218* (2013.01); *F16D 2048/0224* (2013.01); *F16D 2048/0263* (2013.01)

(56) References Cited

U.S. PATENT DOCUMENTS

| | | | | |
|---|---|---|---|---|
| 8,235,198 | B2* | 8/2012 | Pritchard | F16D 25/0638 192/113.34 |
| 8,376,113 | B2* | 2/2013 | Kruse | F16D 48/02 192/85.01 |
| 8,505,295 | B2* | 8/2013 | Suzuki | F15B 1/26 60/584 |
| 8,783,404 | B2* | 7/2014 | Kotaki | B60T 17/06 180/274 |
| 2010/0122887 | A1 | 5/2010 | Pritchard et al. | |
| 2010/0193316 | A1 | 8/2010 | Kruse et al. | |

FOREIGN PATENT DOCUMENTS

| | | |
|---|---|---|
| DE | 102007045056 | 4/2009 |
| DE | 102013204561 | 10/2013 |

\* cited by examiner

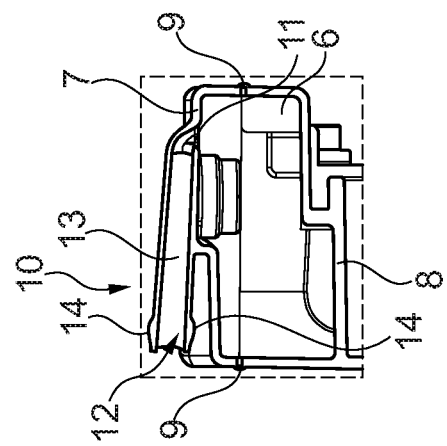
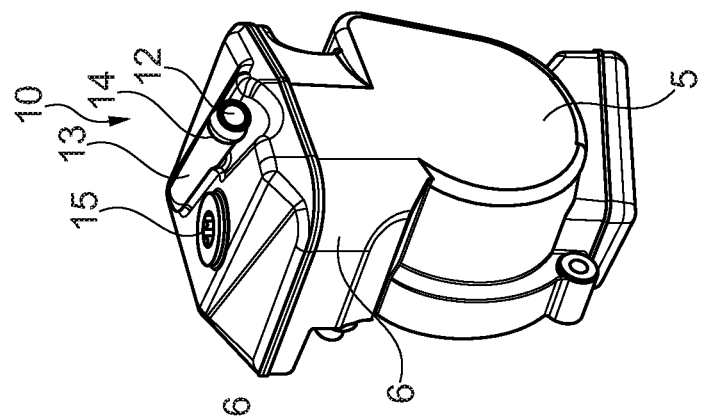
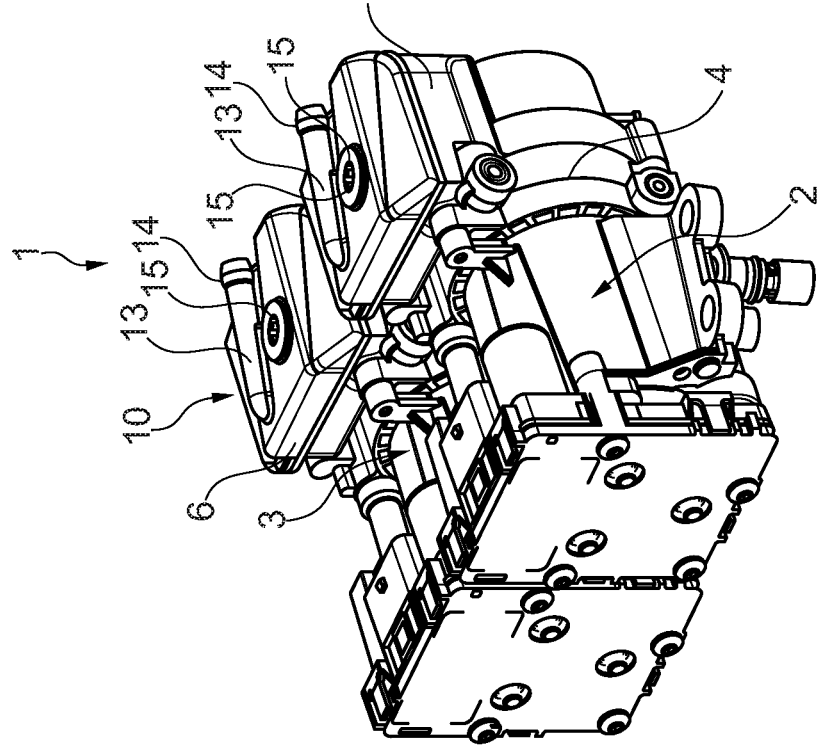

HYDROSTATIC CLUTCH ACTUATOR WITH OVERFLOW

BACKGROUND

The invention relates to a hydrostatic clutch actuator for a clutch, particularly a wet-running clutch of a motor vehicle, with the clutch actuator comprising a drive unit, a master-piston cylinder unit driven thereby, a hydraulic reservoir connected in a fluidic fashion to the master-piston cylinder unit, as well as a hydraulic system for the indirect or direct actuation of the clutch, allowing hydraulic medium to be conveyed via the master-piston cylinder unit from the hydraulic reservoir into the hydraulic system and allowing pressure to be applied to the hydraulic system.

Hydraulic clutch actuators are known in prior art which comprise a closed hydraulic reservoir and thus a closed hydraulic system. For the purpose of pressure compensation generally a bellows or a similar pressure compensation unit is provided in the reservoir or in a lid of the reservoir. Such systems of prior art can perhaps have the disadvantage that depending on the geometry of the bellows here pressure compensation is possible to a limited extent only. Furthermore such systems are considered closed systems, however, as shown in the following, under certain circumstances here an increase in the volume of hydraulic substance can occur in the system, which may lead to the actuator failing.

DE 10 2013 204 561 A1 discloses for example a pressure medium-actuating system with an actuator comprising an output element, which is connected via a connection rod to a piston of a piston-cylinder unit. The piston is arranged in an axially displaceable fashion in the cylinder of the piston-cylinder unit such that an operating pressure chamber can vary in its volume so that pressure medium of the operating pressure chamber can be impinged via the connection line in a second operating pressure chamber of a slave cylinder unit, causing the piston in the cylinder of the piston-cylinder unit to be displaced in the axial direction and via a connection rod and a lever or other connection elements, for example, it can actuate a clutch, for example engaging or disengaging it. The piston-cylinder unit is connected via an aperture and a connection line to a pressure medium reservoir. This can be used to connect the operating pressure chamber to the reservoir in a fluidic fashion such that volume compensation can occur.

A hydrostatic actuator arrangement of the applicant, so far not yet published, is known for an actuating device, particularly for a friction clutch device arranged in a drive train of a motor vehicle driven by an internal combustion engine, with the actuator arrangement comprising at least an electric rotary drive with a stator and a rotor, a transmission device for converting a rotary motion into a translational one with at least one ball transmission drive and at least one master cylinder with an axially displaceable piston, with the rotary drive comprising an axis of rotation and the master cylinder comprising a translational axis, and the rotary drive with its axis of rotation and one master cylinder with its translational axis being arranged parallel and at a distance in reference to each other.

From another older application of the applicant, not yet published, either, a hydrostatic system is known comprising a master cylinder with a linearly displaceable master cylinder piston, variably limiting the pressure chamber of the master cylinder, as well as a slave cylinder with a slave cylinder piston limiting a pressure chamber of the slave cylinder, a hydrostatic path filled with pressure medium between the pressure chambers, a compensation vessel filled with a pressure medium, as well as a sensor bore, arranged between the hydrostatic path and the compensation vessel and controlled depending on a position of the master cylinder piston, with a control of the sensor bore being provided outside the pressure chamber.

The three above-mentioned systems exhibit the disadvantage that the hydraulic reservoir is each time embodied in a closed fashion so that pressure compensation must be ensured between the interior of the system and the environment. For this purpose, pressure compensation devices are used, for example in the form of a bellows arranged in the hydraulic reservoir, which generate additional expense and complexity. Another disadvantage of the above-mentioned closed systems is the fact that no exchange and/or no discharge of hydraulic medium out of this system is possible, which can particularly in a hydrostatic clutch actuator for a wet-running clutch can lead to the following problems:

In wet-running clutches any disengagement system (also called CRS) is usually arranged at least partially inside the wet chamber of the clutch. If in the disengagement system a vacuum develops it may occur that via gaskets, sealing the disengagement system in reference to the wet chamber of the clutch, oil can be suctioned into the disengagement system and this way feed it to the hydraulic system between the disengagement system (CRS) and the clutch actuator (HCA). On the long run, an increase of the fill level of the hydraulic system can occur, particularly when the disengagement system regularly and continuously suctions in oil. In case of excessive increase of the fill level and thus the pressure in the hydraulic system it may occur that, due to the extraordinary pressure, with here pressure acting upon the gaskets from the wrong side, namely from the hydraulic to the clutch, gaskets of the disengagement system start leaking and a desired actuation of the clutch becomes impossible.

SUMMARY

Starting with the above-mentioned prior art, the objective of the present invention is to provide a hydrostatic clutch actuator which is not plagued by the above-mentioned disadvantages and in which particularly any increase of the volume of hydraulic medium in the hydraulic system can be avoided without compromising the function of the clutch actuator.

This objective is attained in a generic clutch according to the invention such that the hydraulic reservoir has an overflow, via which hydraulic medium can be removed/shall be removed from the hydraulic reservoir and from the hydraulic system.

It is a particular advantage of the invention that the hydraulic reservoir is open via the overflow and forms no closed, sealed system from which no hydraulic medium can drain. By providing the overflow at the hydraulic reservoir the particular advantage is provided to allow in a targeted fashion draining or removing excess medium out of the hydraulic system. This is particularly advantageous when the clutch actuator is operated with a wet-running clutch and, under certain circumstances, based on the leakage flow through gaskets between the wet chamber of the clutch and the hydraulic system of the actuator, clutch oil penetrates into the hydraulic system, which results here in an increase of the fluid volume. If the fluid volume in the hydraulic system exceeds a certain limit, excess fluid can drain via the overflow and the system is always operating below the maximally permitted fluid volume. This way the pressure in the hydraulic system can be kept easily and effectively below a critical value, at which medium begins to penetrate through gaskets out of the hydraulic system for example into the wet chamber of the clutch, which leads to premature aging and leakage of the gaskets so that safe and correct operation of the clutch cannot be ensured.

In other words, the hydraulic system of the clutch actuator according to the invention is embodied as an open system, so that pressure compensation in reference to the environment occurs always automatically and continuously. Special equipment for implementing pressure compensation is advantageously not required, which leads to a simplification of the actuator with all advantages connected thereto, such as easier production, lower costs, smaller number of parts, and facilitated maintenance. In the event oil penetrates from the wet chamber of the clutch into the hydraulic system of the clutch actuator in the above-described fashion the pressure in the hydrostatic clutch actuator remains constant and excess oil or hydraulic medium can drain via the overflow and be removed from the hydraulic system.

Advantageous embodiments of the invention are disclosed in the dependent claims and are explained in greater detail in the following.

The overflow can be connected to a unit, particularly in a fluidic fashion, in which unit medium draining via the overflow out of the hydraulic system is received and collected and then forwarded to discarding or reuse or perhaps recycling. It may be connected for example to a collection vessel, an oil pan, an oil tank, or a similar collection unit for hydraulic medium, particularly comprising a transmission housing or a wet chamber of the clutch, e.g., the clutch bell. Any hydraulic medium draining out of the hydraulic reservoir can this way be forwarded to subsequent use in these units. It is further advantageous that medium draining out of the hydraulic system cannot contaminate the environment.

According to one embodiment the overflow may comprise an input opening, through which hydraulic medium can flow out of the hydraulic reservoir into an overflow, and an output opening, through which hydraulic medium can flow out of the overflow. Additionally the overflow may have a tubular line section formed between the input opening and the output opening. By a suitable design of the geometry and the arrangement of the input and output openings as well as the line section, for example a meandering or labyrinth-like progression, the drainage of medium out of the hydraulic reservoir can be largely controlled so that always sufficient fill level of the reservoir is ensured and it is prevented that too much medium drains from the system. An option for regulating the volume of hydraulic medium draining via the overflow is provided when the tubular line section shows at a certain position of the hydraulic reservoir a decline in the direction thereto.

It is particularly advantageous when any flux of hydraulic medium through the overflow into the hydraulic reservoir can be prevented/does not occur. This can be achieved particularly by arranging the input opening higher at an appropriate position and/or arrangement of the clutch actuator than the collection vessel, or in other words by allowing the overflow to be blocked via a return valve or a similar unit. This way the contamination of the medium contained in the hydraulic reservoir can be easily and effectively prevented.

When the output opening is embodied in the form of a tubular connector, here a particularly simple connection of the clutch actuator according to the invention to the peripheral units is possible, such as the collection vessel, etc.

In one embodiment the overflow may be integrated in a lid that closes the hydraulic reservoir. It may preferably be embodied in one piece with the lid. In another embodiment the overflow may be integrated in a wall of the hydraulic reservoir. It may particularly be embodied in one piece with the wall.

In particular in case of a unidirectional overflow it is advantageous for the hydraulic reservoir to have a fill opening, preferably closed with a plug, particularly a threaded plug. Any simple refilling process of hydraulic medium is ensured this way.

In other words, summarizing it can be said that the invention relates to a hydrostatic clutch actuator (HCA) with an overflow option for liquids into an oil pan or oil tank, a transmission housing, a clutch bell, and/or an external reservoir. According to one embodiment a hose connection is directly integrated in the reservoir housing. According to another embodiment a hose connection is integrated in the lid of the reservoir.

BRIEF DESCRIPTION OF THE DRAWINGS

In the following the invention is explained in greater detail based on drawings of several exemplary embodiments. Here shown are:

FIG. 1 a schematic, perspective illustration of a hydrostatic clutch actuator according to the invention in a first embodiment with two electric rotary drives and two master cylinders in a perspective view, FIG. 2 a hydraulic reservoir of the clutch actuator of FIG. 1 alone in a perspective view, FIG. 3 a hydraulic reservoir of the clutch actuator of FIG. 1 alone in a cross-section, FIG. 4 a schematic, perspective illustration of a hydrostatic clutch actuator according to the invention in a second embodiment with two electric rotary drives and two master cylinders in a perspective view, FIG. 5 a hydraulic reservoir of the clutch actuator of FIG. 3 alone in a perspective view and in a cross-section, and FIG. 6 a hydraulic reservoir of the clutch actuator of FIG. 1 alone in a cross-section.

DETAILED DESCRIPTION OF THE PREFERRED EMBODIMENTS

Figure 6:
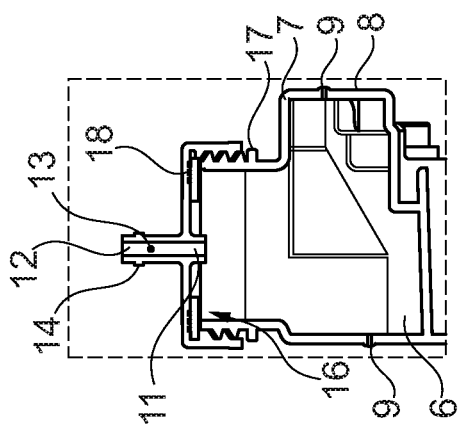

The figures are only of a schematic nature and exclusively serve to understand the invention. Identical elements are marked with the same reference characters. Details of the different embodiments can be combined with each other and/or exchanged for each other.

FIGS. 1 to 3 show a hydrostatic clutch actuator 1 with two electric drives 2, 3 and two master cylinder housings 4, 5 in a perspective illustration. The master cylinder housing 5 is correctly called cover housing and is de facto independent from the master cylinder housing 4. The clutch actuator 1 serves to operate a clutch, not shown in the figures, for example a wet-running duplex clutch for a motor vehicle.

Generally the actuation occurs via a hydraulic system, which is also called the hydraulic path, and an actuator device with two slave cylinders, not shown in the figures, either. Master cylinders received in master cylinder housings 3, 4 can each be connected via the hydraulic path to a slave cylinder so that, starting from the master cylinder, a hydraulic power can be transmitted to the slave cylinder. The duplex clutch comprises two pressure plates, which can be axially displaced with the help of an actuating device, particularly the slave cylinder, respectively between an engaged actuating position and a disengaged actuating position.

The electric drives 2, 3 serve to drive the two master cylinders. The drive 2 is functionally allocated to the master cylinder in the master cylinder housing 3. The drive 3 is functionally allocated to the master cylinder in the master cylinder housing/cover housing 5. The master cylinder housing 5 is a "cover housing" or the like, which protects the interior mechanics of the actuator from influences of the environment.

Hydraulic medium for the hydraulic system comprising the master and slave cylinders is received in a hydraulic reservoir 6. It can be fed via an interposed unit, for example in the form of a regulating valve or a control valve, to the hydraulic system or drained from the hydraulic system.

The hydraulic reservoir 6 is a container, perhaps made from plastic or metal, preferably an injection-molded container. In the examples shown an upper bowl 7 and a lower bowl 8 are connected to each other tightly via a welded seam 9. In the embodiment of FIGS. 1 and 2 the upper bowl 7 shows an overflow 10 integrated therewith in one piece. It shows an input opening 11, via which medium can drain from the hydraulic reservoir 6 into the overflow 10, an outlet opening 12 via which medium can drain from the overflow 10, and a line section 13 arranged between the inlet opening 11 and the outlet opening 12. The latter is lightly declined in the direction of the hydraulic reservoir 6 in the intended arrangement of the clutch actuator 1. The outlet opening 12 is embodied as a hose connection with bulges 14 for a clamping connection of a hose, not shown, via which medium draining from the hydraulic reservoir 6 can be fed to the collection tank or oil pan. For the purpose of an easy filling process of the hydraulic reservoir 6 with hydraulic medium its upper bowl 7 is provided with a fill opening, which can be closed with a threaded plug 15.

Figure 5:
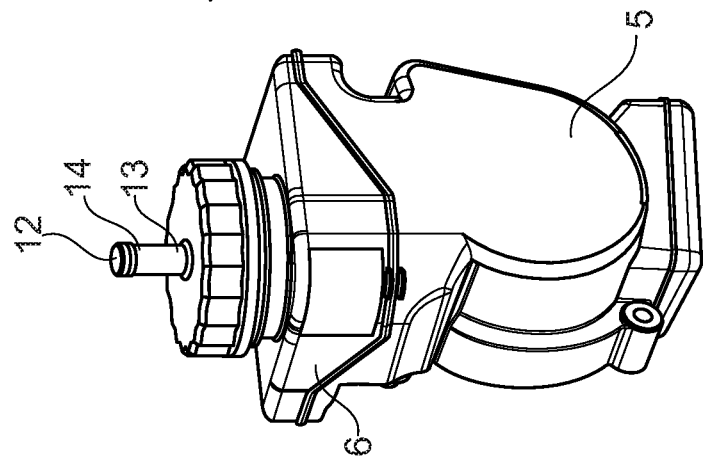
Figure 4:
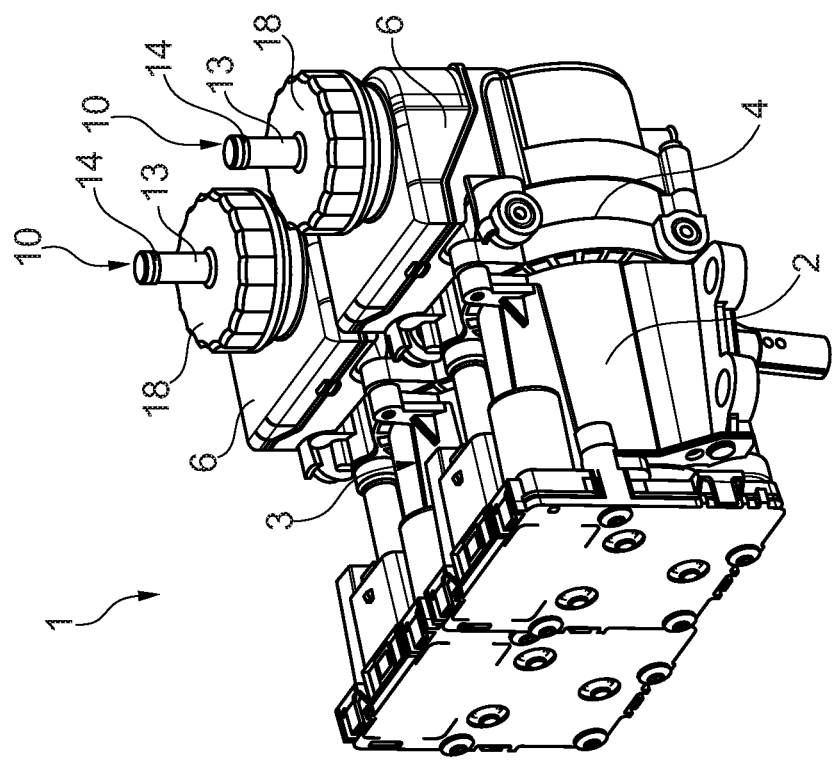

FIGS. 4 to 6 show another embodiment of the invention, which is similar to the embodiment of FIGS. 1 and 2 so that in the following only the differences are explained and for the rest reference is made to the embodiment of FIGS. 1 and 2. The upper bowl 7 of the hydraulic reservoir 6 of this embodiment is embodied with a fill opening 16. The wall of the upper bowl 7 surrounding it is provided with an external thread 17, onto which a threaded cover 18 with an internal thread is screwed to close the fill opening 15. The overflow 10 is inserted into the center of the threaded cover 18, comprising a line section 13 with an input opening 11 and an output opening 12. The end of the line section 13 at the output side is also embodied as a hose connector with bulges 14 for clamping a hose. In this embodiment it is advantageous that an additional fill opening is not required because filling occurs via the fill opening 16 by unscrewing the cover 18.

In the two embodiments shown the overflow 10 is located as high as possible in the hydraulic reservoir. It serves both for draining excess medium from the hydraulic reservoir 6 as well as ventilating and exhausting the hydraulic system in case of pressure fluctuations.

LIST OF REFERENCE CHARACTERS 1 clutch actuator
2 drive
3 drive
4 master cylinder housing
5 master cylinder housing/lid housing
6 hydraulic reservoir
7 upper bowl
8 lower bowl
9 welding seam
10 overflow
11 inlet opening
12 outlet opening
13 line section
14 bulging
15 threaded plug
16 fill opening
17 external thread
18 threaded cover

The invention claimed is:

1. A hydrostatic clutch actuator for a clutch of a motor vehicle, the clutch actuator comprising a drive unit, a master-piston cylinder unit driven by the drive unit, a hydraulic reservoir connected in a fluidic fashion to the master-piston cylinder unit, a hydraulic system for operating the clutch, allowing conveyance of hydraulic medium via the master-piston cylinder unit from the hydraulic reservoir to the hydraulic system and applying pressure upon the hydraulic system,
 the hydraulic reservoir comprises an overflow by which the hydraulic medium is drainable from the hydraulic reservoir and the hydraulic system,
 the overflow comprises an input opening, which is embodied for conducting hydraulic medium from the hydraulic reservoir into the overflow and the overflow comprises an outlet opening which is provided to allow draining the hydraulic medium out of the overflow,
 wherein a tubular line section provided between the input opening and the output opening declines towards the input opening in an intended position of the hydraulic reservoir.

2. The hydrostatic clutch actuator according to claim 1, wherein the overflow is embodied such that any flux of the hydraulic medium through the overflow into the hydraulic reservoir is prevented.

3. The hydrostatic clutch actuator according to claim 1, wherein the input opening is arranged higher than the collection vessel connected to the overflow or that the overflow is blockable by a return valve in an intended position of the clutch actuator.

4. The hydrostatic clutch actuator according to claim 1, wherein the outlet opening comprises a hose connector.

5. The hydrostatic clutch actuator according to claim 1, wherein the overflow is integrated in a wall of the hydraulic reservoir.

6. The hydrostatic clutch actuator according to claim 1, wherein the hydraulic reservoir has a fill opening.

\* \* \* \* \*